Oct. 27, 1970     V. W. LEE ET AL     3,536,891

INFRARED HEATED DISH STORAGE APPARATUS

Filed Aug. 21, 1967     2 Sheets-Sheet 1

INVENTORS
VELOISE W. LEE
JOE P. MCDONALD
BY Anderson, Spangler & Wymore
ATTORNEYS

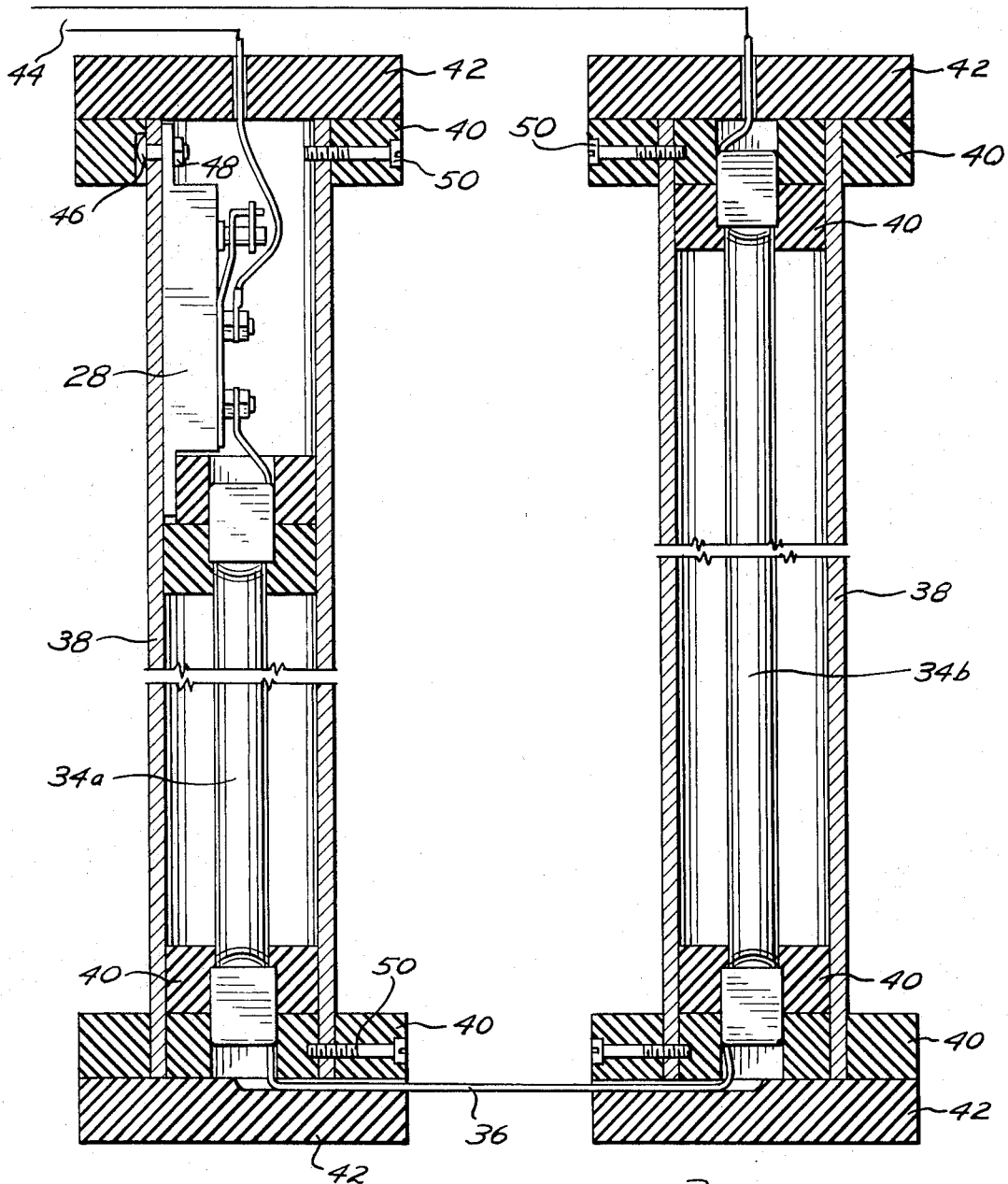
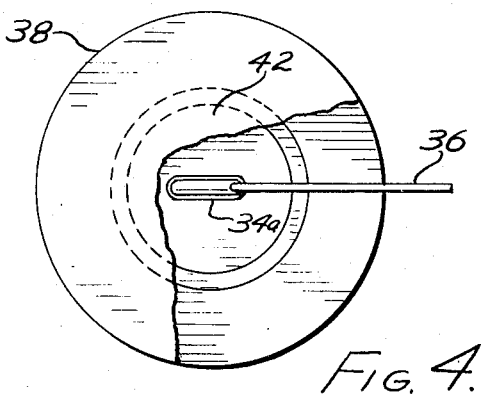
Fig. 3.
Fig. 4.
INVENTORS
VELOISE W. LEE
JOE P. MCDONALD

United States Patent Office 3,536,891
Patented Oct. 27, 1970

3,536,891
INFRARED HEATED DISH STORAGE APPARATUS
Veloise W. Lee, 7241 Madison 64114, and Joe P. McDonald, 5809 E. 95th Terrace 64134, both of Kansas City, Mo.
Filed Aug. 21, 1967, Ser. No. 662,048
Int. Cl. F24c 15/18
U.S. Cl. 219—385                     11 Claims

ABSTRACT OF THE DISCLOSURE

This invention relates to a cabinet, preferably mobile, within which one or more dish storage tubes are mounted. A specially designed spring is positioned inside the tube and a holding device is mounted on the upper surface of the spring. The holder is adapted to move up or down within the tube as the spring to which it is attached is depressed or reelased, depending upon the number and weight of the objects placed on the holder. An infrared heating system is mounted within the cabinet to provide a means of heating the said dish storage tubes and any stored objects therein.

The prior art is replete with various devices for the storage of serving dishes and other similar items. Some of these devices also incorporate heating units; however, substantially all of the known food dish storage devices, or lowraters as they are referred to by those versed in the art, include a heating element shielded by an iron or steel cover and are positioned in the bottom center of the lowrater. Accordingly, most prior art lowraters are heated by conductance, thereby requiring a considerable and undesiable period to warm the lowrater and dishes stacked therein. Moreover, many of the heating units of the prior art tend to operate erratically and require extensive and frequent maintenance thereof.

Accordingly, it is an object of this invention to provide an improved cabinet or lowrater for the storage and warming of serving dishes and other similar items.

Another object of this invention is to provide a lowrater having an improved heating system.

A further object of this invention is to provide an improved lowrater having a heating system which achieves a desired temperature in a relatively short period of time.

An additional objective of this invention is to provide an improved lowrater having an efficient and improved heating system and requiring a minimum of maintenance thereon.

Still another object of this invention is to provide a high performance lowrater apparatus capable of economical manufacture.

Other objects of the invention will be apparent from a careful reading of the following description and attached drawings, wherein:

FIG. 3 is an enlarged vertical section of the two heat cells; and

FIG. 4 is an end view of one of the heat cells shown in FIG. 3.

Figure 1:
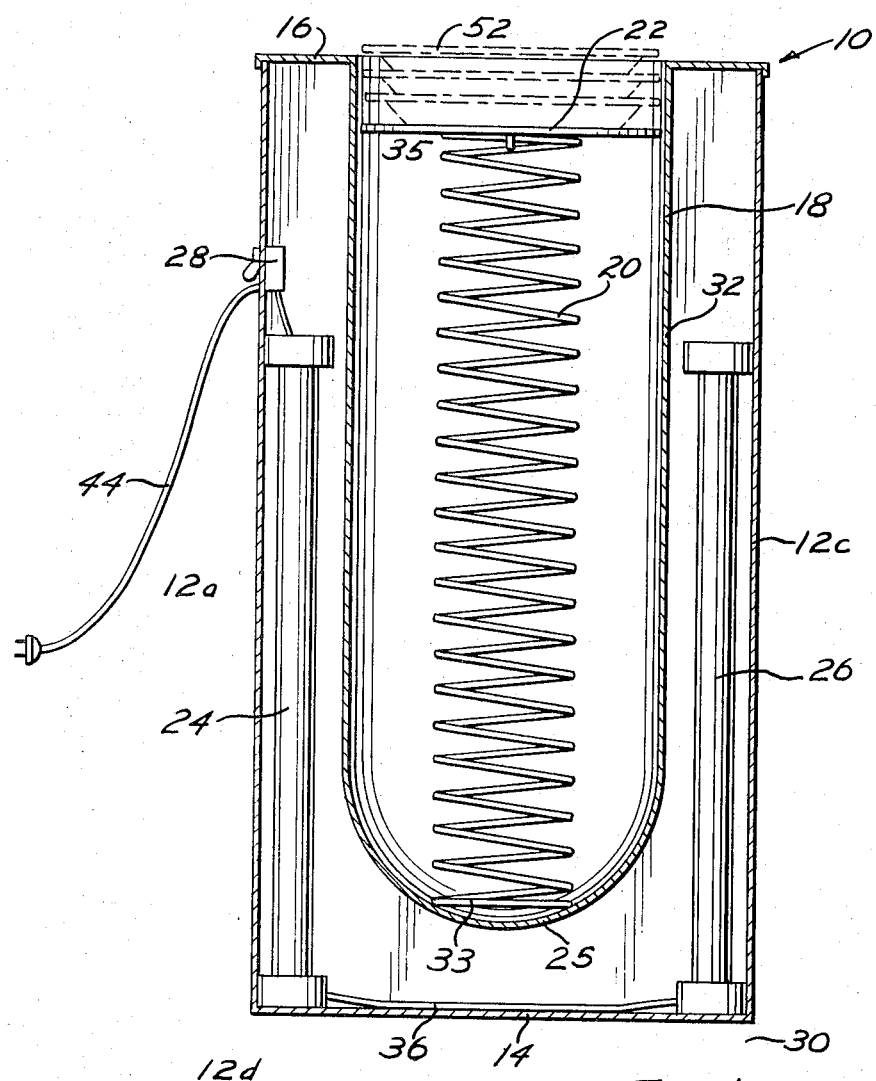
FIG. 1 is a partial sectional view of the apparatus showing serving dishes stored therein.
Figure 2:
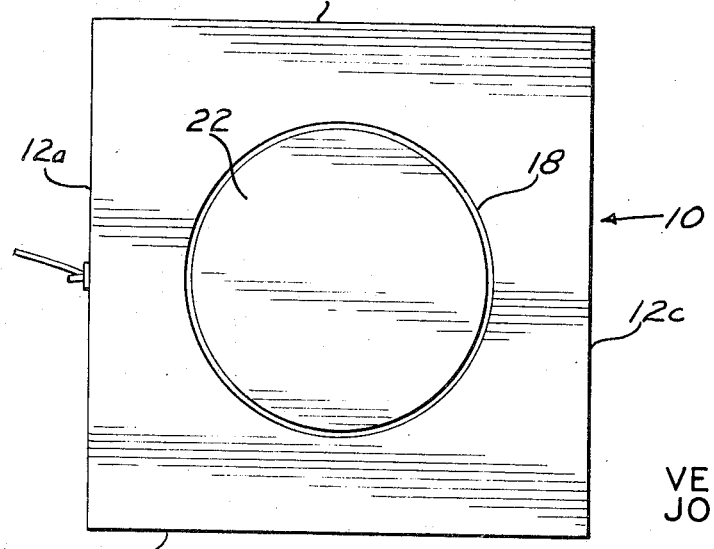
FIG. 2 is a top plan view of the apparatus shown in FIG. 1.

Referring to the drawings, the present invention in general comprises a cabinet having four sides 12a, b, c and d, a bottom plate 14 and a top plate 16. It will be noted that a tube or chamber 18, preferably metal, is positioned within the cabinet 10 and opens level with the top plate 16. A spring 20 is positioned within said tube 18 and a metal plate holder 22 is connected to the upper end of said spring 20. The holder is designed to have food serving plates positioned thereon and will move up or down within the tube 18 as the spring 20 to which it is connected is depressed or released, depending on the number of plates positioned thereon. The holder 22, therefore, will have substantially the same equivalent geometrical shape as the said tube 18. A pair of heat cells 24 and 26 are positioned within the cabinet 10 essentially parallel to each other, but on opposite sides of the tube 18 and parallel thereto. Their purpose is to warm the said cabinet 10 to any desired temperature, thereby also heating the stacked plates within tube 18. The heat cells are connected together electrically and cell 24 includes a thermostat 28 for controlling the temperature of both cells 24 and 26. Casters or wheels 30 may be mounted on the bottom plate 14 in order to render mobility to the cabinet.

The four sides 12a, b, c and d, as well as the bottom plate 14 and the top plate 16, are all preferably constructed of strong metal sheet suitably joined together as by welding or by a bolt and nut arrangement. Since the present invention is to be employed primarily in the food preparation industry, in hospitals and elsewhere, the metal utilized in manufacturing the various parts of the cabinet 10 should not only be esthetic, but easily maintained and cleaned. For this reason, stainless steel is completely satisfactorily for use in this invention.

As can be seen from FIG. 1, tube 18 extends within the cabinet 10 parallel to the side plates 12a, b, c and d. The said tube 18 may be a separate unit preferably of metal and removably mounted within the cabinet 10, or it may be designed as a unit integral with the top plate 16. In the latter instance, the top plate 16 dips down within the center of the said cabinet 10 to form the aforementioned tube 18.

The spring 20, which is located within the tube 18, may be freely positioned therein, or the bottom portion 33 of said spring 20 may be connected to the tube bottom indicated as 25. The connection may be a weld or a bolt and nut arrangement. The metal plate holder 22 connected to the top 35 of the spring 20 is flat and substantially circular in appearance. Thus, it should be clear that, as the dishes or other similar objects are placed in the holder 22, their weight will depress the spring 20 (FIG. 1). The said spring 20 is so designed and manufactured to depress the same approximate distance as the depth of the dish placed on the holder 22. A dish one inch in depth placed on the holder 22 would depress the spring 20 approximately one inch and, similarly, ten dishes placed one on top of the other would depress the spring 20 approximately ten inches. Conversely, when a one inch dish is removed from the top of the stacked dishes, the spring 20 would raise the remaining dishes stacked on the plate holder 22 within the tube 18 an equivalent one inch. Thus, the top dish is always resting level with the surface of top plate 16 ready for removal. The foregoing description and drawings relate to a cabinet having only one tube with a spring therein and attached plate holder. However, it is clear that any number of tubes with the necessary springs and dish holders can be positioned in the foregoing cabinet, depending upon the needs of the ultimate user of the invention.

The heat cells 24 and 26, as stated previously, are positioned within the cabinet 10 in a parallel relationship on either side of and parallel to the tube 18. Each heat cell 24 and 26 is connected at one end to the opposite portion of the bottom plate 14 and at the other end to opposed cabinet sides 12a and 12C, respectively. Each of said heat cells 24 and 26 includes an infrared quartz bulb 34a and b supported coaxially within a metal heat cell tube 38. The bulbs 34a and b are insulated from the said metal heat cell tube 38 by insulation material 40 and by the insulation caps 42 shown in FIG. 3. The said bulbs 34a and b are connected in electrical series as at 36 and one of the bulbs 34a has a thermostat 28 included in its wiring design in order to provide a temperature control for both bulbs 34a and b and to automatically cut off the electrical power to the said bulbs 34a and b should the cabinet 10 overheat. The said thermostat 28 is mounted on the metal heat cell tube 38 by a screw and nut arrangement 46 and 48, respectively, as shown in FIG. 3. The insulated cord 44 connects the bulb 34a and, in turn, the entire heating system with a standard 110 volt electrical outlet. Since the infrared bulbs 34a and b are enclosed by the metal heat cell tube 38, the tube should be constructed of a light metal material through which heat can be easily radiated. Applicant has found that aluminum is completely satisfactory for this purpose. It will be noted that bolts 50 anchor the metal heat cell tube 38 within the insulation material 40. While only two heat cells are described herein, it is emphasized that, obviously, more than this number could be incorporated into the invention should the cabinet 10 be enlarged or more serving dish holding means, i.e. tubes, springs and plate holder, be provided in the cabinet 10.

The infrared bulbs 34a and b, as described above, heat the cabinet 10 by radiation and conductance, rather than by conductance alone as do the electrical heating elements employed in the prior art, and, consequently, are much more efficient than prior art heating means. It is clear that the heat cells 24 and 26, with their enclosed infrared bulbs 34a and b being positioned on opposite sides of the cabinet 10 and parallel to the tube 18 in which the dishes are stacked, provide a remarkably effective and patentably improved means for heating and warming the cabinet 10. It is pointed out and emphasized that, although the infrared heat cells 24 and 26 are only set forth in the drawings and described in relation to warming dishes stacked in the cabinet 10, the said infrared heat cells 24 and 26 may be employed for other similar uses such as in food cabinets or carts and the like.

Thus, it is easily seen that the cabinet 10, with the tube 18 positioned therein and the spring 20 with the plate holder 22 attached thereto, provides a very satisfactory means for storage of serving dishes 52 therein, as has been stated previously. Such a dish holding cabinet is referred to by those in the art as a lowrater. The inclusion of the two infrared heat cells 24 and 26 provide a vastly improved arrangement for heating or warming the serving dishes. Most prior art lowraters require from one and one-half to two hours to warm the dishes stacked therein; however, the present lowrater as described above only requires substantially about 20 minutes.

Obviously, many modifications and variations of the invention as herein described may be made without departing from the spirit and scope thereof and, therefore, only such limitations should be imposed as are indicated in the appended claims.

What is claimed is:

1. A device for storing serving dishes and warming the same, comprising in combination: a cabinet; a tube having a closed bottom positioned within said cabinet and opening through the top thereof to define a heating chamber between said cabinet and the tube; a spring dish holder mounted coaxially within said tube having one end thereof positioned level with the top of said cabinet and adapted to receive dishes thereon, said spring dish holder designed to move either up or down within said tube as the spring portion of said dish holder is depressed or released depending on the number of dishes placed thereon; and, at least two elongated infrared heat cells mounted in said heating chamber to either side of the tube and substantially coextensive therewith, said heat cells being substantially parallel with the tube and to each other, said heat cells being connected in series electrically and designed to warm said cabinet and stored dishes therein.

2. A device for storing dishes and warming the same, comprising in combination: a cabinet; a tube having a closed bottom positioned within said cabinet and opening through the top thereof to define a closed heating chamber between said cabinet and the tube; a spring mounted coaxially within said tube and supported on the bottom thereof; a dish holder mounted on one end of the said spring and positioned level with the top of said cabinet, said dish holder designed to move either up or down within said tube as the said spring is either depressed or released depending on the number of dishes placed thereon; and, at least two elongated infrared heat cells mounted in said heating chamber to either side of the tube and substantially coextensive therewith, said heat cells being substantially parallel with said tube and to each other, said heat cells being connected in series electrically and designed to warm said cabinet and stored dishes therein.

3. The device as defined in claim 2 wherein said infrared heat cells include:
   a metal heat cell tube; and
   an infrared quartz bulb positioned coaxially within said metal heat cell tube and insulated therefrom, said infrared bulb connected to an adjacent infrared bulb in an electrical series relationship.

4. The device as defined in claim 3 wherein:
   the metal heat cell tube is constructed of aluminum.

5. The device as defined in claim 3 wherein:
   a thermostat is mounted on said cabinet and electrically connected to one of said infrared quartz bulbs, thus providing a temperature control for said infrared bulbs electrically connected in series.

6. A device for storing and warming dishes comprising in combination: a cabinet having metal side and end plates, a metal top plate having an opening therein and a metal bottom plate; a metal tube closed at the bottom mounted in the opening on the top plate and extending within the interior of said cabinet to define a closed heating chamber between said tube and said cabinet, said metal tube having an opening level with the top of said metal top plate; a spring mounted within said tube and supported on the bottom thereof coaxially therewith; a dish holder mounted on the top end of said spring and positioned level with the top of said cabinet, said dish holder designed to move either up or down within said tube depending on the type and number of dishes placed thereon; and, at least two elongated infrared heat cells connected electrically in series and mounted in said heating chamber to either side of the tube and substantially coextensive and parallel therewith and to each other, said heat cells designed to warm said cabinet and dishes stored therein.

7. The device as defined in claim 6 wherein said infrared heat cells include:
   a metal heat cell tube; and
   an infrered quartz bulb positioned coaxially within said metal heat cell tube and insulated therefrom, said infrared bulbs connected to an adjacent infrared bulb in an electrical series relationship.

8. The device as defined in claim 7 wherein:
   the metal heat cell tube is constructed of aluminum.

9. The device as defined in claim 7 wherein:
   a thermostat is mounted in said heat chamber and electrically connected to one of said infrared quartz bulbs, thus providing a temperature control for said infrared bulbs electrically connected in series.

10. In a device for storing and warming dishes having a cabinet with a tube having a closed bottom end and an open top positioned therein, defining a closed heating chamber between said tube and cabinet, a spring dish holder mounted in said tube and designed to either move up or down within said tube depending on the number of dishes placed on said dish holder, the improvement comprising at least two elongated infrared heat cells mounted in said heat chamber, said heat cells each including a metal heat cell tube and an infrared quartz bulb positioned coaxially within said metal heat cell tube and insulated therefrom, said infrared quartz bulbs connected one to the other in electrical series relationship, said heat cells being positioned to either side of the tube in coextensive parallel relation therewith and to each other.

11. The device of claim 10 wherein:
   a thermostat is mounted in said heat chamber and connected electrically to one of said infrared quartz bulbs, thus providing a temperature control for both said bulbs.

References Cited

UNITED STATES PATENTS

| 2,251,876 | 8/1941 | Gibbs | 312—71 |
| 2,609,265 | 9/1952 | Larsen | 312—71 |
| 2,951,928 | 9/1960 | Gialanella | 219—354 X |
| 3,012,141 | 12/1961 | Thomiszer | 219—342 |
| 3,053,600 | 9/1962 | Holloway | 312—236 X |
| 3,160,734 | 12/1964 | Rylander | 219—342 X |
| 3,204,085 | 8/1965 | Busby | 219—354 X |
| 3,351,741 | 11/1967 | Shelley | 219—385 |

FOREIGN PATENTS 908,793   10/1962   Great Britain.

BERNARD A. GILHEANY, Primary Examiner

R. N. ENVALL, JR., Assistant Examiner

U.S. Cl. X.R.

219—354, 544; 312—236